(12) United States Patent
Suzuki et al.

(10) Patent No.: US 10,166,909 B2
(45) Date of Patent: Jan. 1, 2019

(54) OPTICAL SENSOR DISPOSITION STRUCTURE FOR SADDLE RIDING VEHICLE

(71) Applicant: HONDA MOTOR CO., LTD., Tokyo (JP)

(72) Inventors: Osamu Suzuki, Asaka (JP); Kiyoshi Katagiri, Kawasaki (JP); Manabu Ichikawa, Tokorozawa (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/590,674

(22) Filed: May 9, 2017

(65) Prior Publication Data

US 2017/0327026 A1   Nov. 16, 2017

(30) Foreign Application Priority Data

May 13, 2016 (JP) ................................. 2016-097421

(51) Int. Cl.
```
B60Q 1/00      (2006.01)
G01S 17/93     (2006.01)
B62J 17/02     (2006.01)
B62K 11/04     (2006.01)
G01S 13/93     (2006.01)
```
(Continued)

(52) U.S. Cl.
CPC ............ B60Q 1/0023 (2013.01); B62J 17/02 (2013.01); B62K 11/04 (2013.01); G01S 17/936 (2013.01); *B60W 2300/36* (2013.01); *B60Y 2200/12* (2013.01); *B62J 2099/002* (2013.01); *B62K 2207/00* (2013.01); *G01S 13/931* (2013.01); *G08G 1/166* (2013.01)

(58) Field of Classification Search
CPC ... B60Q 1/0023; B62J 17/02; B62J 2099/002; B62K 11/04; B62K 2207/00; G01S 17/936; G01S 13/931; B60W 2300/36; B60Y 2200/12; G08G 1/166
See application file for complete search history.

(56) References Cited

U.S. PATENT DOCUMENTS 5,725,709 A * 3/1998 Jensen .................... B29C 70/30
                                                            156/155
2008/0136923 A1* 6/2008 Inbar .................... G02B 27/646
                                                            348/208.2

(Continued)

FOREIGN PATENT DOCUMENTS

| EP | 2471396 A2 | 7/2012 |
| EP | 2824022 A1 | 1/2015 |
| JP | 2006-103600 A | 4/2006 |

OTHER PUBLICATIONS

Extended European Search Report, dated Oct. 9, 2017, for European Application No. 17170231.9.

*Primary Examiner* — Nay Tun
(74) *Attorney, Agent, or Firm* — Birch, Stewart, Kolasch & Birch, LLP (57) ABSTRACT

An optical sensor disposition structure for a saddle riding vehicle includes an optical sensor, and an airflow guide member disposed in front of a head pipe and configured to cover a front section of a vehicle body and in which an introduction port configured to guide traveling air rearward is formed, wherein the optical sensor overlaps the introduction port when seen in a front view.

19 Claims, 8 Drawing Sheets

(51) Int. Cl.
  *G08G 1/16* (2006.01)
  *B62J 99/00* (2009.01)

(56) References Cited

U.S. PATENT DOCUMENTS

| | | | |
|---|---|---|---|
| 2010/0097264 A1* | 4/2010 | Kawasaki | G01S 7/032 342/70 |
| 2015/0241221 A1* | 8/2015 | Colby | G01C 23/00 701/431 |
| 2015/0296108 A1* | 10/2015 | Hayakawa | G03B 17/08 348/148 |
| 2016/0067597 A1* | 3/2016 | Hamilton | A63F 9/14 463/6 |
| 2017/0182952 A1* | 6/2017 | Carlson | B60R 11/04 |

* cited by examiner

OPTICAL SENSOR DISPOSITION STRUCTURE FOR SADDLE RIDING VEHICLE

CROSS-REFERENCE TO RELATED APPLICATION

Priority is claimed on Japanese Patent Application No. 2016-097421, filed May 13, 2016, the content of which is incorporated herein by reference.

BACKGROUND

Field of the Invention

The present invention relates to an optical sensor disposition structure for a saddle riding vehicle.

Field of the Invention

For example, an optical sensor disposition structure for a saddle riding vehicle of the related art is disclosed in Japanese Unexamined Patent Application, First Publication No. 2006-103600. This is a structure in which a camera is installed on a central portion of a window screen.

SUMMARY

However, when such a disposition is provided, since the camera is easily seen from the outside, appearance characteristics are degraded.

Meanwhile, in order to improve the appearance characteristics, installing the camera at a position that cannot be easily seen from the outside may be considered. However, in this case, a field of vision of the camera may be narrowed.

An aspect of the present invention is directed to providing an optical sensor disposition structure for a saddle riding vehicle capable of improving appearance characteristics while maintaining a detection region of an optical sensor.

An optical sensor disposition structure for a saddle riding vehicle according to the present invention employs the following configuration.

(1) An optical sensor disposition structure for a saddle riding vehicle including a head pipe and a vehicle body according to an aspect of the present invention includes an optical sensor, and an airflow guide member that is disposed in front of a head pipe and that is configured to cover a front section of a vehicle body, and in which an introduction port configured to guide traveling air rearward is formed, wherein the optical sensor overlaps the introduction port when seen in a front view.

(2) In the aspect of (1), a second airflow guide member that forms an airflow guide path configured to guide the traveling air between the airflow guide member and the second airflow guide member may be further provided, and the optical sensor may include a lens disposed on a boundary section between the airflow guide member and the second airflow guide member.

(3) In the aspect of (2), the boundary section may be formed in a recessed section formed by the airflow guide member and the second airflow guide member.

(4) In the aspect of (2) or (3), the lens may overlap the airflow guide member when seen in a side view.

(5) In the aspect of any one of (2) to (4), the optical sensor may be installed inward than the second airflow guide member in a vehicle width direction.

According to the aspect of (1), as the optical sensor overlaps the introduction port when seen in a front view, the optical sensor can be disposed on a place where the optical sensor cannot be easily seen while being exposed to a front surface. That is, narrowing of a detection region of the optical sensor can be avoided, and the optical sensor cannot be easily seen from the outside. Accordingly, appearance characteristics can be improved while maintaining the detection region of the optical sensor.

According to the aspect of (2), as the optical sensor includes the lens disposed on the boundary section between the airflow guide member and the second airflow guide member, narrowing of the detection region of the optical sensor can be effectively avoided, and it is more difficult to visually recognize the optical sensor from the outside.

Accordingly, appearance characteristics can be further improved while effectively maintaining the detection region of the optical sensor.

According to the aspect of (3), as the boundary section is formed at the recessed section formed by the airflow guide member and the second airflow guide member, the airflow guide member and the second airflow guide member can be formed in a shape along an angle of view (a viewing angle) of the optical sensor. Accordingly, appearance characteristics can be further improved while more effectively maintaining the detection region of the optical sensor.

According to the aspect of (4), as the lens overlaps the airflow guide member when seen in a side view, since the optical sensor cannot be easily seen from the sides, appearance characteristics from the sides can be further improved. In addition, as the lens overlaps the airflow guide member when seen in a side view, damage to the optical sensor due to collision from the sides can be minimized.

According to the aspect of (5), as the optical sensor is installed inward than the second airflow guide member in the vehicle width direction, in comparison with a case in which the optical sensor is installed outward than the second airflow guide member in the vehicle width direction, since increase in size of the front section of the vehicle body outward in the vehicle width direction can be suppressed, appearance characteristics can be further improved.

DESCRIPTION OF EMBODIMENTS

Hereinafter, embodiments of the present invention will be described based on the accompanying drawings. Further, directions of forward, rearward, left, right, and so on, described below are the same as directions in a vehicle described below unless the context clearly indicates otherwise. In addition, in appropriate places in the drawings used in the following description, an arrow FR showing a forward direction with respect to a vehicle, an arrow LH showing a leftward direction with respect to the vehicle and an arrow UP showing an upward direction with respect to the vehicle are provided.

First Embodiment

Figure 1:
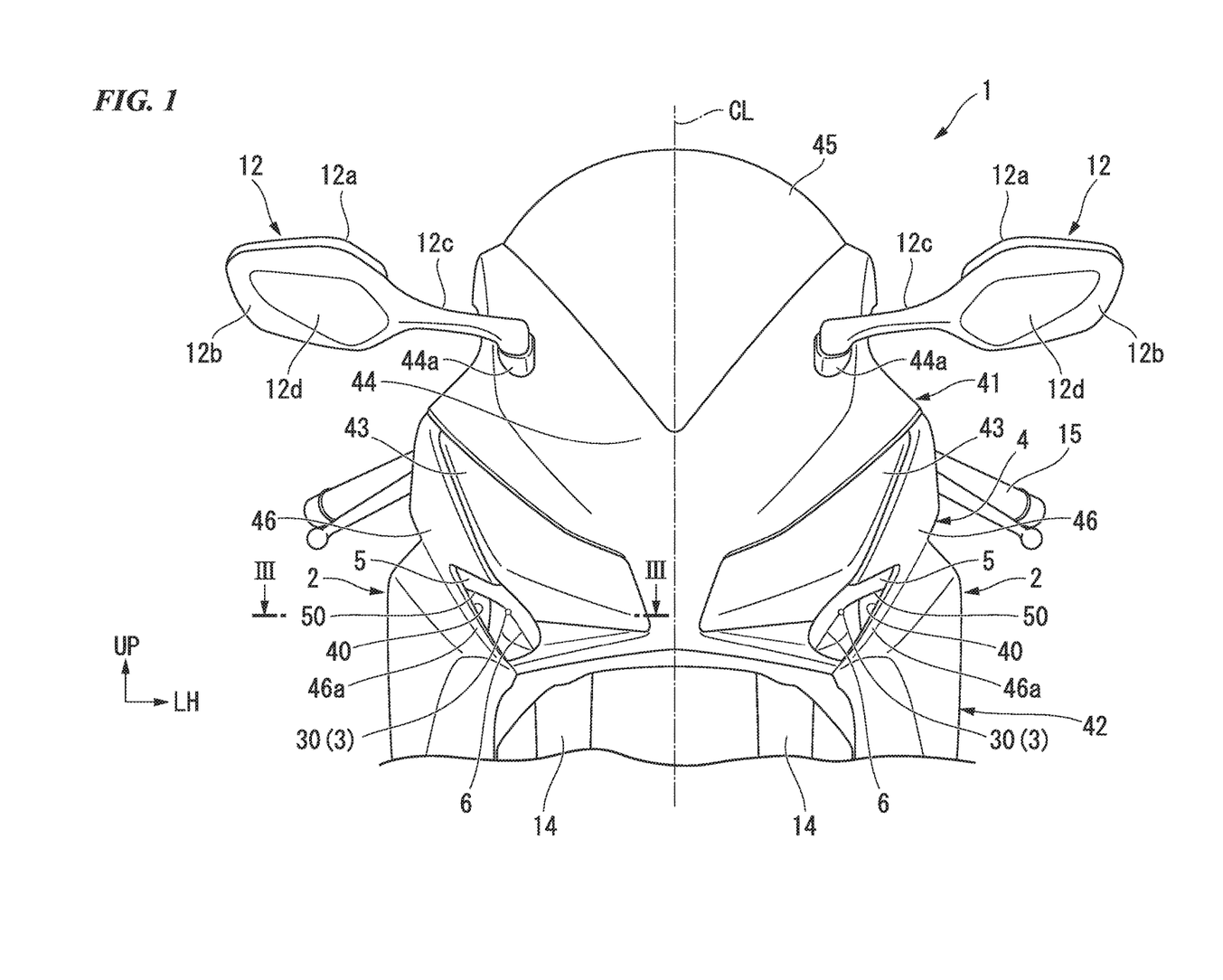
FIG. 1 is a front view of a motorcycle according to a first embodiment.

FIG. 1 shows a camera disposition structure of a sports type motorcycle 1 including a camera that is capable of capturing an object or the like in front of a vehicle, as an example of an optical sensor disposition structure for a saddle riding vehicle. Hereinafter, the motorcycle 1 may be simply referred to as "a vehicle."

<Optical Sensor Disposition Structure>

The optical sensor disposition structure will be described with reference to both of FIGS. 1 and 2. An optical sensor disposition structure 2 includes a pair of left and right cameras 30 (optical sensor) disposed on a front section of a vehicle body, a front cowl 4 (an airflow guide member) that is disposed in front of a head pipe 11 (see FIG. 2) of a front end of a vehicle body frame 10, that is configured to cover the front section of the vehicle body and that has introduction ports 40 configured to guide traveling air rearward, and intake ducts 5 (second airflow guide member) that form airflow guide paths 50 between the front cowl 4 and the intake ducts 5 and that is configured to guide traveling air.

<Front Cowl>

As shown in FIG. 1, the front cowl 4 includes an upper cowl 41 configured to cover a front upper section of the vehicle body frame 10 from the front toward the left and right sides, and left and right side cowls 42 that continues to the left and right sides of the upper cowl 41 and that is configured to cover the left and right sides of the vehicle body frame 10.

A pair of left and right headlights 43 is disposed at a front section of the upper cowl 41.

The upper cowl 41 includes an upper center cowl 44 configured to cover upper sides of the left and right headlights 43, a window screen 45 extending upward from the upper center cowl 44, and left and right upper side cowls 46 configured to cover left and right side portions of the left and right headlights 43 above the left and right side cowls 42.

Mounting seats 44a of a pair of left and right rearview mirrors 12 are installed on the upper center cowl 44.

Each of the left and right rearview mirrors 12 includes a mirror main body 12a, a housing 12b configured to hold the mirror main body 12a, and a mirror stay 12c configured to support the housing 12b.

Turn indicators 12d are installed on front sections of the left and right housings 12b.

Base end portions of the left and right mirror stays 12c pass through the mounting seat 44a of the upper center cowl 44 and are fastened and fixed to a support stay (not shown) disposed inside the upper cowl 41.

The left and right upper side cowls 46 extend forward and rearward to cover left and right side portions of the left and right intake ducts 5. Airflow guide wall sections 46a that are configured to form the introduction ports 40 and that are configured to form the airflow guide paths 50 between the intake ducts 5 and the airflow guide wall sections 46a are respectively provided at the front end portions of the left and right upper side cowls 46. When seen in a front view of FIG. 1, the airflow guide wall sections 46a are inclined downward so that the more inward part of the airflow guide wall sections 46a in a vehicle width direction is disposed at more downward position. When seen in a cross-sectional view of FIG. 3, the airflow guide wall sections 46a are inclined rearward so that the more outward part of the airflow guide wall sections 46a in the vehicle width direction is disposed at more rearward position.

Further, reference numeral 14 in the drawings designates left and right front forks steerably supported by the head pipe 11 via a steering stem 13, reference numeral 15 in the drawings designates a bar type steering handle attached onto a top bridge 13a of the steering stem 13, reference numeral 13b in the drawings designates a bottom bridge of the steering stem 13, reference numeral 16 in the drawings designates a meter unit including various gauges and an information display part, and reference numeral 17 in the drawings designates a monitor panel that can display images or the like captured by the left and right cameras 30.

<Intake Duct>

The intake ducts will be described with reference to both of FIGS. 1 and 2. The pair of left and right intake ducts 5 is disposed on left and right sides of the vehicle body frame 10.

Figure 3:
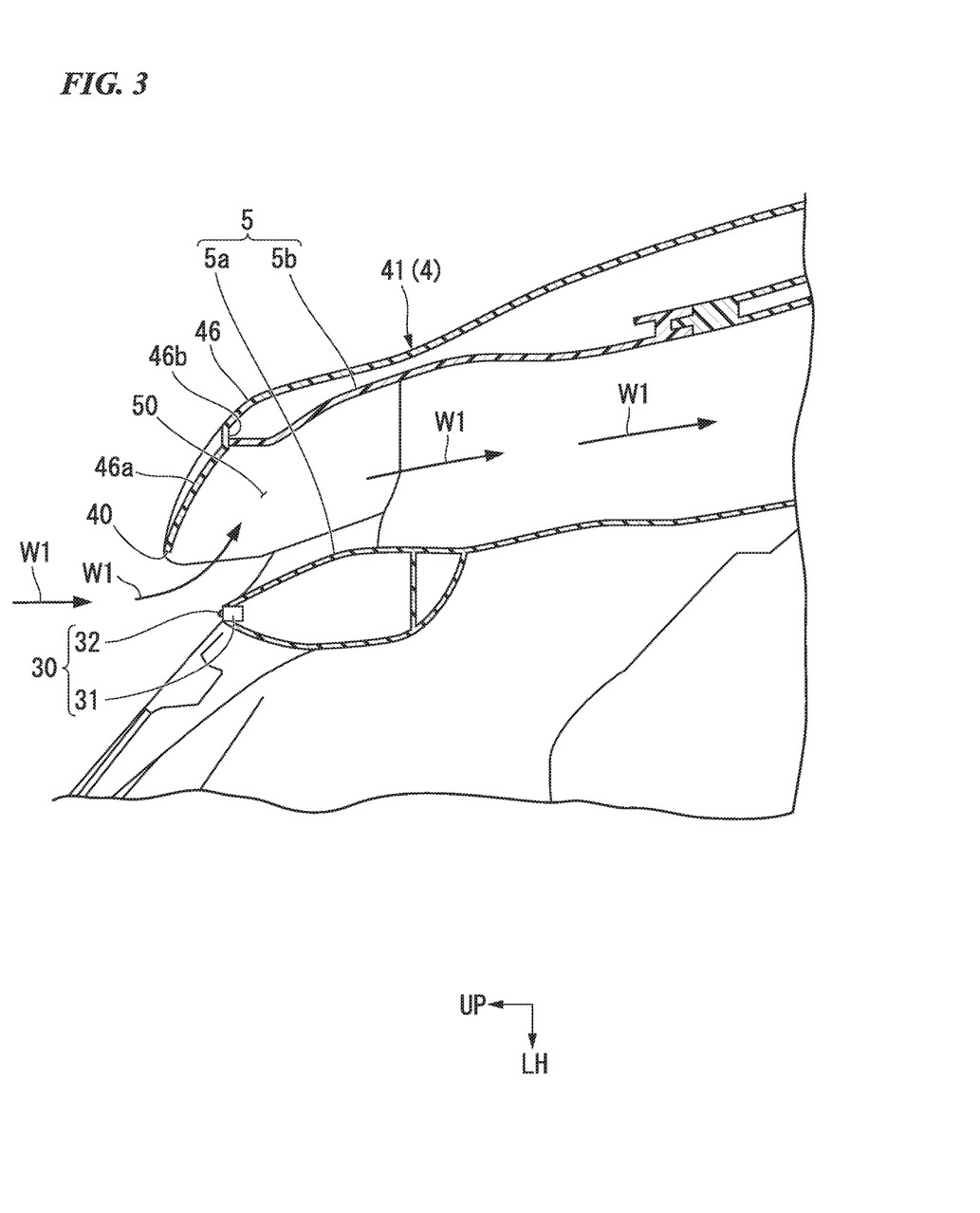
FIG. 3 is a view including a cross section taken along line of FIG. 1.

Referring to both of FIGS. 1 and 3, the left and right intake ducts 5 form the airflow guide paths 50 configured to guide traveling air entering from the introduction port 40 rearward between the upper cowl 41 and the left and right intake ducts 5.

The left and right intake ducts 5 extend in a forward/rearward direction. Rear end portions of the left and right intake ducts 5 are connected to an air cleaner (not shown).

Figure 2:
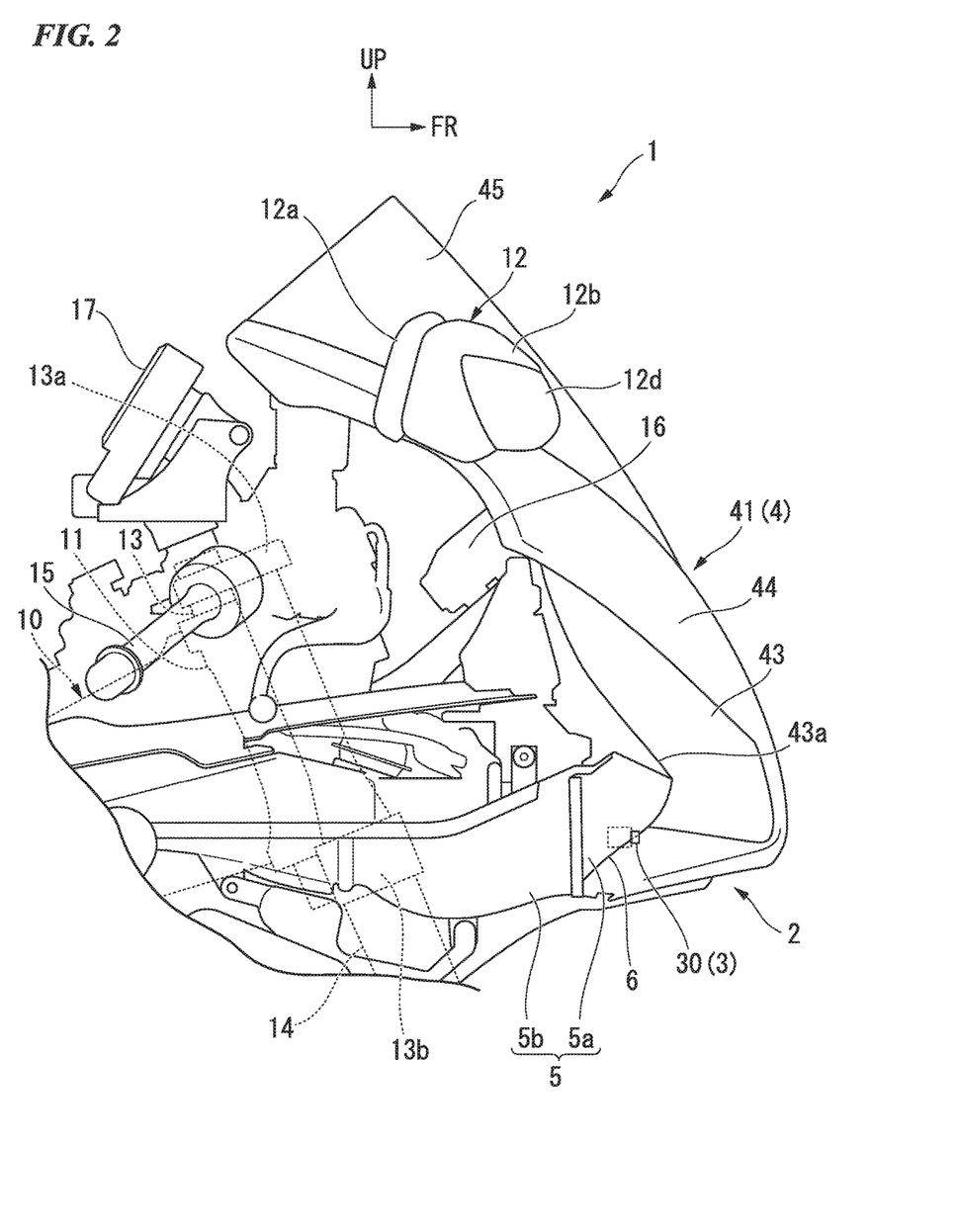
FIG. 2 is a right side view of the motorcycle according to the first embodiment, showing a state in which a right side cowl is removed.

Referring to both of FIGS. 2 and 3, the right intake duct 5 includes a duct inner wall 5a disposed inside in a vehicle width direction, and a duct outer wall 5b disposed more outside than the duct inner wall 5a in the vehicle width direction. Further, since the left intake duct 5 has the same configuration as the right intake duct 5, detailed description thereof will be omitted.

When seen in a right side view of FIG. 2, the duct inner wall 5a is inclined to extend rearward and downward from a position overlapping a ridge 43a of the right headlight 43, and then, bent to extend rearward. When seen in a cross-sectional view of FIG. 3, the duct inner wall 5a is inclined to extend rightward and rearward from a right portion of the right camera 30, and then, curves to extend rearward.

When seen in a right side view of FIG. 2, the duct outer wall 5b extends rearward from a front edge extending, vertically at a position separated rearward from the right camera 30 so as to overlap the duct inner wall 5a. When seen in a cross-sectional view of FIG. 3, the duct outer wall 5b extends rearward from an inner wall 46b of the right upper side cowls 46 (specifically, an extension section extending outward from a rear end of the airflow guide wall sections 46a in the vehicle width direction), and then, extends rearward while being curved to be spaced a predetermined interval from the duct inner wall 5a in the vehicle width direction.

According to the above-mentioned configuration, traveling air introduced from the introduction ports 40 of the front cowl 4 passes through the airflow guide paths 50 in between the front cowl 4 and the intake ducts 5, and then, is guided into the intake duct 5 (i.e., enters between the duct inner wall 5a and the duct outer wall 5b) to flow rearward. Further, reference numeral W1 in FIG. 3 represents a flow of airflow.

<Camera>

The cameras will be described with reference to both of FIGS. 1 and 2. The vehicle includes a driving assistance system 3 using the cameras. The driving assistance system 3 includes the pair of left and right cameras 30 disposed on left and right symmetrical positions having a vehicle body bilateral centerline CL in between.

The left and right cameras 30 constitute a stereo camera that captures an object or the like in front of the vehicle from different viewpoints with each other. The driving assistance system 3 is capable of detecting an object or the like in front of the vehicle by capturing a forward side of the vehicle using the left and right cameras 30.

The left and right cameras 30 output the captured image to an image processor in a control device (not shown) of the driving assistance system 3.

The image processor performs recognition of the object or the like including another vehicle in front of the vehicle, calculation of a distance between the target and the vehicle, or the like, on the basis of the image captured by the left and right cameras 30. The image processor outputs processing information to a command section of the control device.

The command section outputs commands for performing driving assistance such as brake control, steering control, and so on, to prevent collision of the vehicle, various alarms for an occupant, and so on, to the respective parts of the vehicle.

Further, the driving assistance system 3 may be linked to a navigation system and a cruise control system, and the left and right cameras 30 may be used in a drive recorder.

As shown in FIG. 1, each of the left and right cameras 30 are respectively disposed more outside in leftward and rightward than the respective left and right front forks 14 when seen in a front view. Accordingly, a distance between the left and right cameras 30 in the vehicle width direction can be secured while having the left and right front forks 14 in between thereof, and a distance or the like between the vehicle and a target in front of the vehicle can be accurately measured.

Each of the left and right cameras 30 are disposed adjacent to the respective left and right headlights 43. Accordingly, since a forward side of the vehicle can be easily captured even during nighttime, detection precision of a target in front of the vehicle can be increased.

Figure 4:
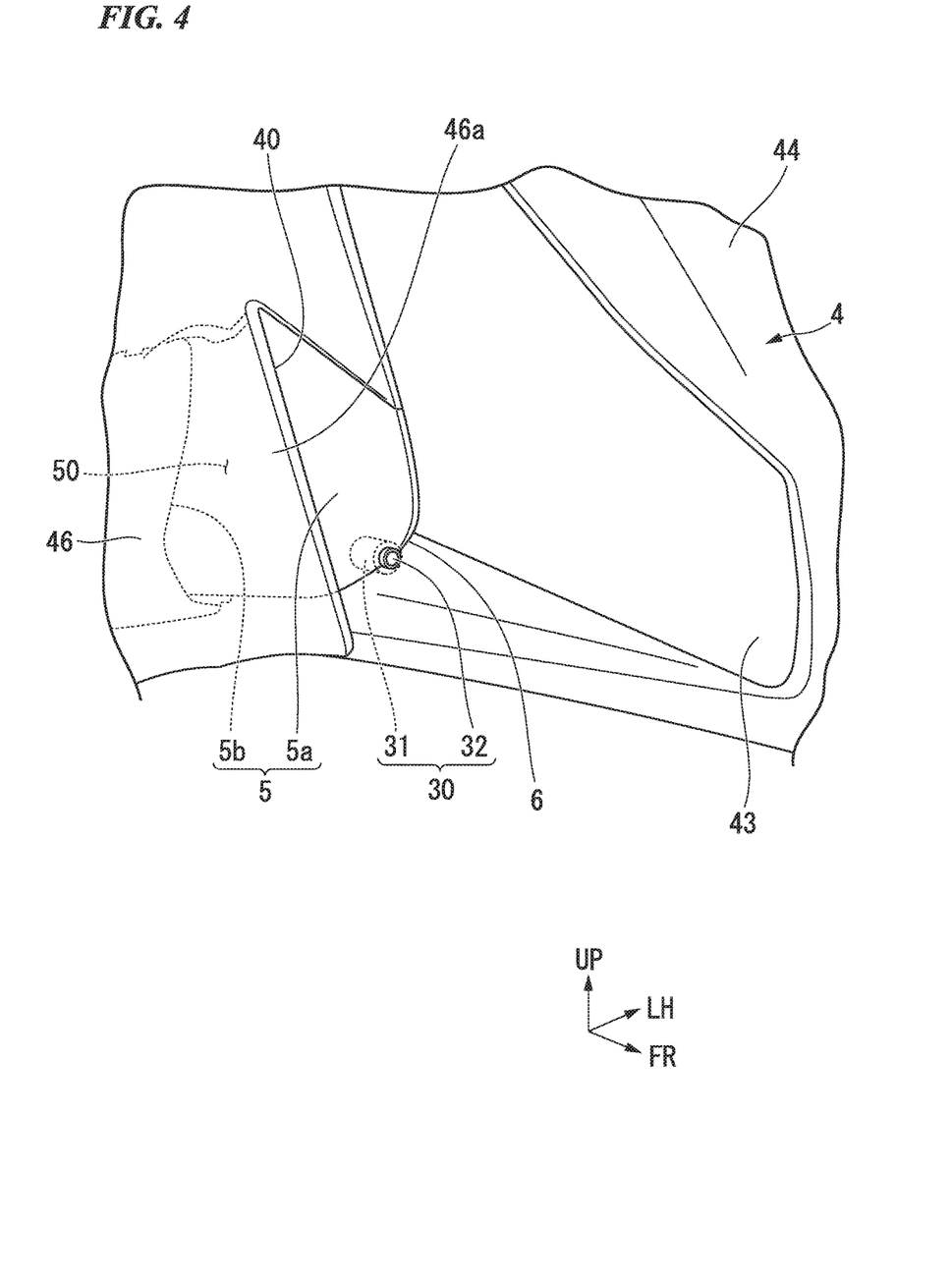
FIG. 4 is a perspective view showing an optical sensor disposition structure according to the first embodiment when seen from a right front side.

When seen in a front view of FIG. 1, the left and right cameras 30 overlap the introduction ports 40. Referring to both of FIGS. 3 and 4, the camera 30 includes a camera main body 31, and a lens 32 protruding from the camera main body 31 toward a forward side of the vehicle.

The camera main body 31 is covered with the duct inner wall 5a of the intake duct 5 from the outside in the vehicle width direction.

That is, the cameras 30 are installed inward from the intake ducts 5 in the vehicle width direction. While not shown, the camera main bodies 31 are connected to a control device, a power supply unit, and so on, via harnesses.

Figure 5:
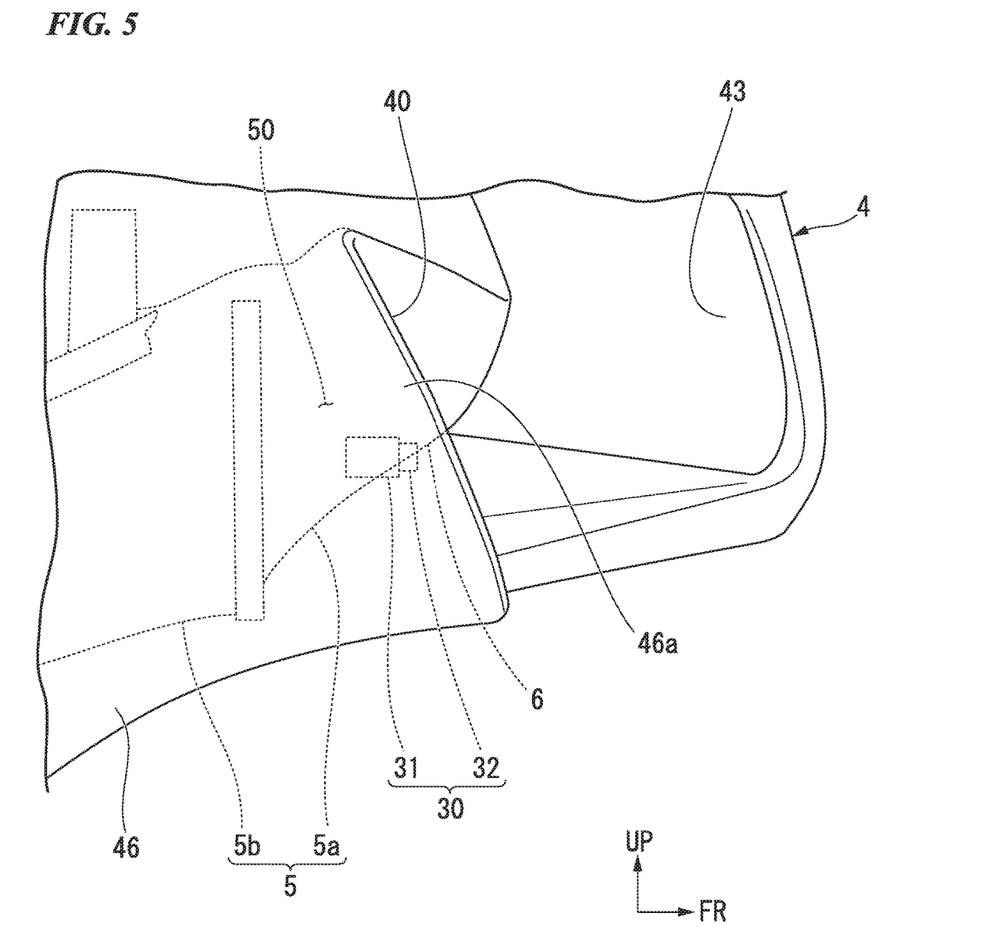
FIG. 5 is a right side view showing the optical sensor disposition structure according to the first embodiment.

The lenses 32 are disposed on boundary sections 6 between the front cowl 4 and the intake ducts 5. When seen in a right side view of FIG. 5, the lens 32 overlaps the front cowl 4. Specifically, in the right view of FIG. 5, the lens 32 overlaps the right upper side cowl 46, and is disposed more inside than the right upper side cowl 46 in the vehicle width direction. When seen in the right side view of FIG. 5, the lens 32 is disposed behind a front edge of the airflow guide wall section 46a inclined so that the more downward part of the airflow guide wall sections 46a is disposed at more forward position. As shown in FIG. 3, since the lens 32 is disposed behind the introduction port 40, the lens 32 cannot be easily seen.

The lenses 32 are exposed to a forward side of the vehicle through the introduction ports 40. That is, no member or the like that blocks a field of vision of the cameras 30 is disposed in front of the camera 30. Accordingly, the cameras 30 can capture a forward side of the vehicle through the introduction ports 40.

As described above, the optical sensor disposition structure 2 of the motorcycle 1 of the embodiment includes the cameras 30 and the front cowl 4 disposed in a front side of the head pipe 11 and that is configured to cover the front section of the vehicle body and having the introduction ports 40 configured to guide traveling air rearward, and the cameras 30 overlap the introduction ports 40 when seen in a front view.

According to the above-mentioned configuration, as the cameras 30 overlap the introduction ports 40 when seen in a front view, the cameras 30 can be disposed on places at which the cameras 30 cannot be easily seen in a state exposed to a front surface. That is, the cameras 30 cannot be easily seen from the outside while avoiding narrowing of a detection region (i.e., a field of vision) of the cameras 30. Accordingly, appearance characteristics can be improved while maintaining the detection region of the cameras 30.

In addition, in the embodiment, as the cameras 30 include the lenses 32 disposed on the boundary sections 6 between the front cowl 4 and the intake ducts 5, narrowing of the detection region of the cameras 30 can be effectively avoided, and it can be more difficult to visually recognize the cameras 30 from the outside. Accordingly, appearance characteristics can be further improved while effectively maintaining the detection region of the cameras 30.

In addition, in the embodiment, as the lenses 32 overlap the front cowl 4 when seen in a side view, since the cameras 30 cannot be easily seen from the sides, appearance characteristics from the sides can be further improved. In addition, as the lenses 32 overlap the front cowl 4 when seen in a side view, damage to the cameras 30 and the lenses 32 due to collision from the sides can be suppressed.

In addition, in the embodiment, as the cameras 30 are installed inward than the intake ducts 5 in the vehicle width direction, in comparison with the case in which the cameras 30 are installed outward than the intake ducts 5 in the vehicle width direction, since increase in size of the front section of the vehicle body outward in the vehicle width direction can be suppressed, appearance characteristics can be further improved.

Second Embodiment

Figure 6:
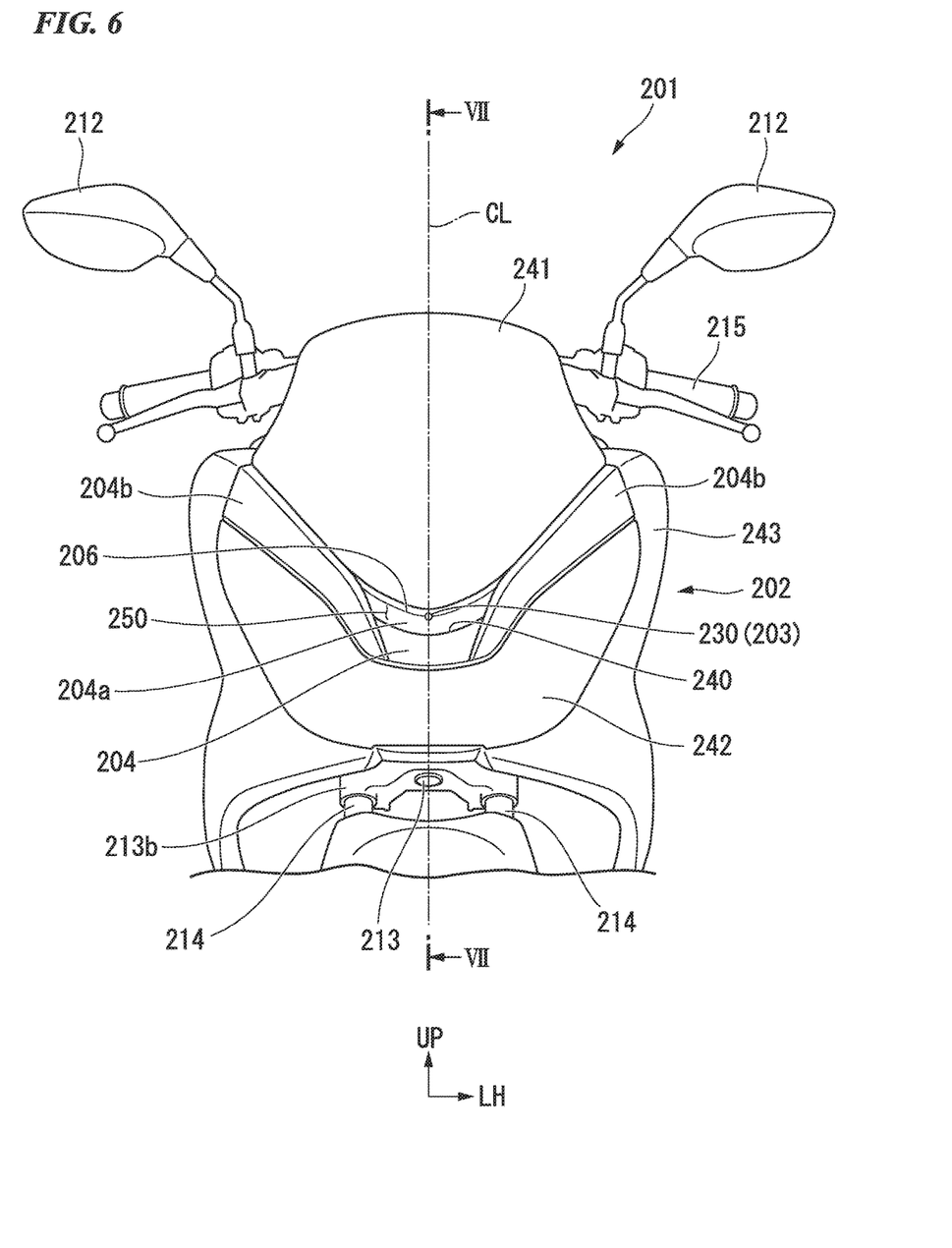
FIG. 6 is a front view of a motorcycle according to a second embodiment.
Figure 7:
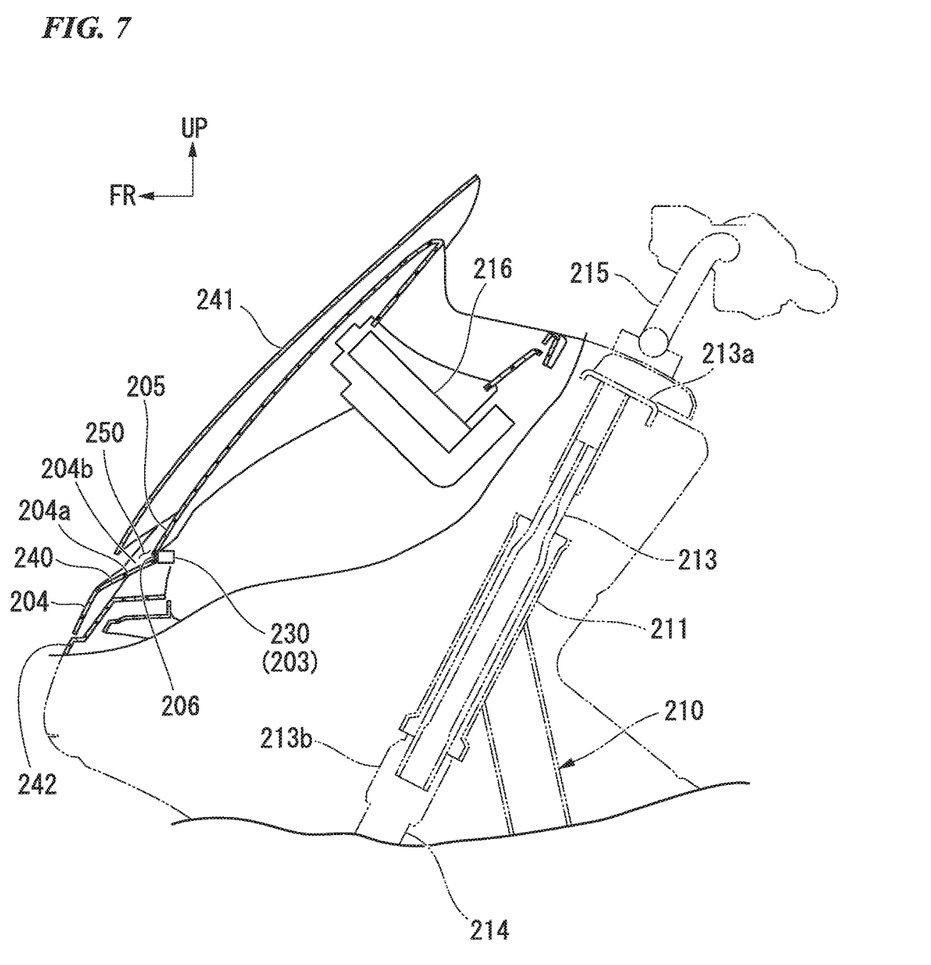
FIG. 7 is a view including a cross section taken along line VII-VII of FIG. 6.
Figure 8:
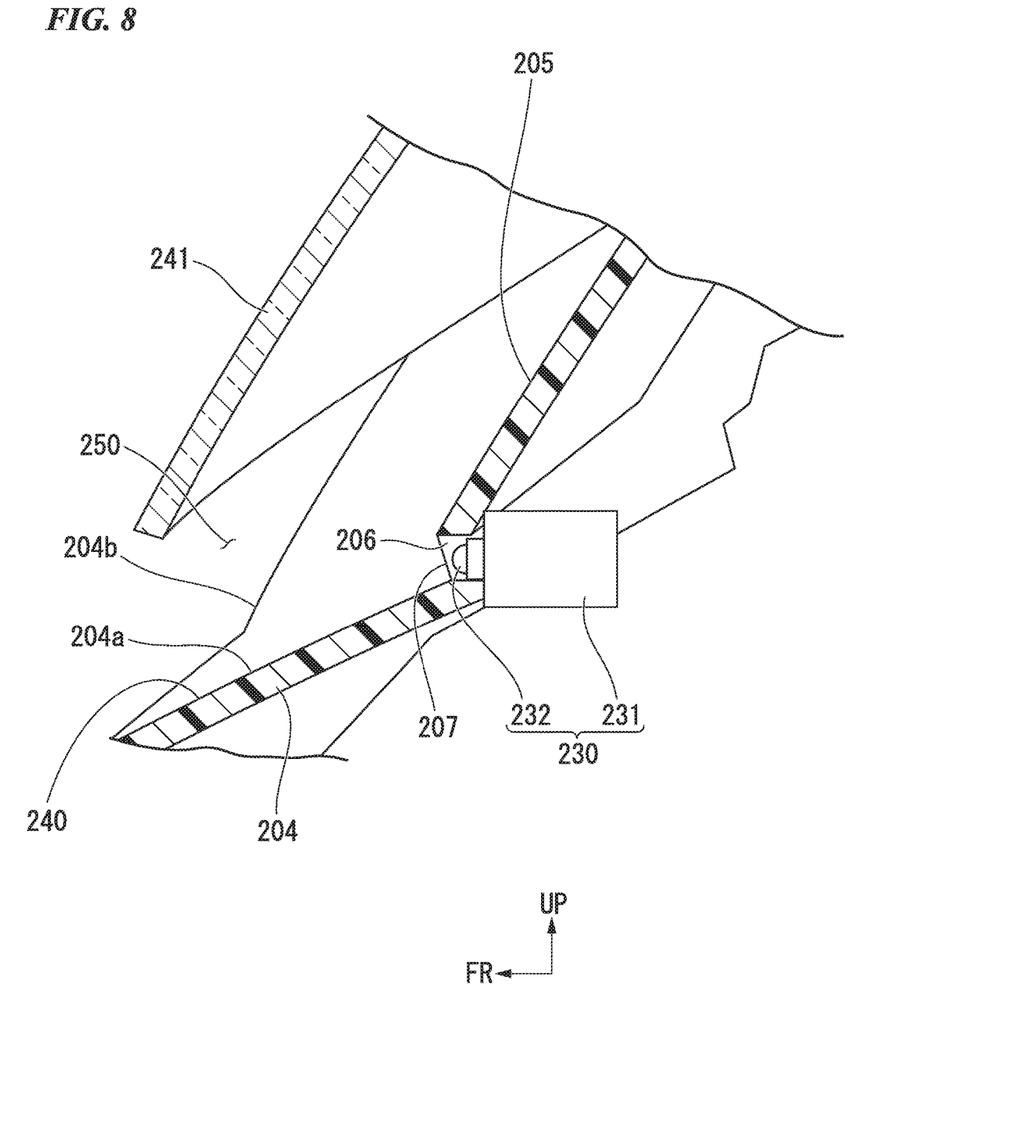
FIG. 8 is a partially enlarged view of FIG. 7.

As shown in FIGS. 6 to 8, in a second embodiment, as an example of an optical sensor disposition structure for a saddle riding vehicle, a camera disposition structure for a scooter type motorcycle 201 includes a camera 230 that that is capable of capturing an object or the like in front of the vehicle. Further, in the following description, the components that are same as those in the above-mentioned first embodiment are designated by the same reference numerals and description thereof is omitted.

<Optical Sensor Disposition Structure>

The optical sensor disposition structure will be described with reference to both of FIGS. 6 and 7. The optical sensor disposition structure 202 includes the camera 230 (an optical sensor) disposed on a front section of the vehicle body, a garnish 204 (an airflow guide member) that is disposed in front of a head pipe 211 (see FIG. 7) of a front end of a vehicle body frame 210 and that is configured to cover the front section of the vehicle body and in which an introduction port 240 configured to guide traveling air rearward is formed, and a meter panel 205 (a second airflow guide member) that forms an airflow guide path 250 configured to guide traveling air between the garnish 204 and meter panel 205.

<Garnish>

The garnish 204 is attached to a front cowl 243 configured to cover a front upper section of the vehicle body frame 210 from a front side toward the left and right sides. When seen in a front view of FIG. 6, the garnish 204 is formed in a U shape that widens outward in the vehicle width direction as it goes upward.

An airflow guide wall section 204a that is configured to form the introduction port 240 and that is configured to form the airflow guide path 250 between the meter panel 205 and the airflow guide wall section 204a, and an outer side portion 204b that is exposed to the outside, are formed at the garnish 204. When seen in a cross-sectional view of FIG. 8, the airflow guide wall section 204a is inclined so that the more rearward part of the airflow guide wall section 204a is disposed at more upward position. When seen in a cross-sectional view of FIG. 8, the outer side portion 204b is inclined more steeply than the airflow guide wall section 204a so that more rearward part of the outer side portion 204b is disposed at more upward position.

Referring to both of FIGS. 6 and 7, a meter visor 241 is disposed above the garnish 204. A headlight 242 is disposed below the garnish 204. When seen in a front view of FIG. 6, the headlight 242 is formed in a U shape having upper edges along lower edges of the garnish 204.

Further, reference numeral 212 in the drawings designates a pair of left and right rearview mirrors, reference numeral 214 in the drawings designates left and right front forks steerably supported by the head pipe 211 via a steering stem 213, reference numeral 215 in the drawings designates a bar type steering handle attached onto a top bridge 213a of the steering stem 213, reference numeral 213b in the drawings designates a bottom bridge of the steering stem 213, and reference numeral 216 in the drawings designates a meter unit including various gauges and an information display part.

<Meter Panel>

As shown in FIG. 7, the meter panel 205 is disposed behind the meter visor 241. The meter panel 205 forms the airflow guide path 250 configured to guide traveling air entering from the introduction port 240 rearward between the garnish 204 and the meter panel 205. When seen in a cross-sectional view of FIG. 7, the meter panel 205 extends in an inclined manner so that more upward part of the meter panel 205 is disposed at more rearward position while having a predetermined interval from the meter visor 241.

<Camera>

The vehicle includes a driving assistance system 203 using a camera. The driving assistance system 203 includes only one camera 230 disposed on a position overlapping a vehicle body bilateral centerline CL when seen in a front view of FIG. 6. The driving assistance system 203 is capable of detecting an object or the like in front of the vehicle by capturing a forward side of the vehicle using the camera 230.

The camera 230 is disposed above a bottom bridge 213b. Accordingly, disturbance with respect to the camera 230 from below can be suppressed by the bottom bridge 213b. In addition, in comparison with the case in which the camera 230 is disposed below the bottom bridge 213b, since a height of the camera 230 can be increased and a proportion of a space above a road surface within a detection range of the camera 230 is increased, detection precision in front of the vehicle can be increased. The camera 230 is disposed adjacent to the headlight 242. Accordingly, since the forward side of the vehicle can be easily captured even at nighttime, detection precision of a target in front of the vehicle can be increased.

When seen in a front view of FIG. 6, the camera 230 overlaps the introduction port 240. As shown in FIG. 8, the camera 230 includes a camera main body 231 and a lens 232 protruding from the camera main body 231 toward a front side of the vehicle.

The camera main body 231 is covered with the garnish 204 and the meter panel 205.

That is, the camera main body 231 is installed not to be exposed to the outside. While not shown, the camera main body 231 is connected to a control device, a power supply unit, and so on, via a harness.

The lens 232 is disposed on a boundary section 206 between the garnish 204 and the meter panel 205. When seen in a cross-sectional view of FIG. 8, the boundary section 206 is a portion between a rear end of the airflow guide wall section 204a which is inclined so that more upward part of the airflow guide wall section 204a is disposed at more rearward position, and a lower end of the meter panel 205 which is inclined more steeply than the airflow guide wall section 204a so that the more rearward part of the meter panel 205 is disposed at more upward position. The boundary section 206 is formed in a recessed section 207 that is formed by the garnish 204 and the meter panel 205 and that is recessed rearward.

The lens 232 overlaps the outer side portion 204b of the garnish 204 when seen in a side view. Specifically, when seen in a cross-sectional view of FIG. 8, the lens 232 is disposed inside of the outer side portion 204b in the vehicle width direction while overlapping the outer side portion 204b. When seen in the cross-sectional view of FIG. 8, the lens 232 is disposed behind a front edge of the outer side portion 204b which is inclined so that the more upward part of the outer side portion 204b is disposed at more rearward position. As shown in FIG. 8, since the lens 232 is disposed behind the introduction port 240, the lens 232 cannot be easily seen.

A lower end of the meter panel 205 and a lower end of the meter visor 241 are disposed above the lens 232. A rear upper end of the airflow guide wall section 204a of the garnish 204 is disposed below the lens 232.

The lens 232 is exposed to a front side of the vehicle through the introduction port 240. That is, no member or the like that blocks a field of vision of the camera 230 is disposed in front of the camera 230. Accordingly, the camera 230 can capture a forward side of the vehicle through the introduction port 240.

As described above, the optical sensor disposition structure 202 of the motorcycle 201 of the embodiment includes the camera 230, and the garnish 204 disposed in front of the head pipe 211 and configured to cover the front section of the vehicle body and in which the introduction port 240 configured to guide traveling air rearward is formed, and the camera 230 overlaps the introduction port 240 when seen in the front view.

According to the configuration, as the camera 230 overlaps the introduction port 240 when seen in a front view, the camera 230 can be disposed on a place where the camera 230 cannot be easily seen while being exposed to the front side. That is, narrowing of the detection region of the camera 230 can be avoided, and the camera 230 cannot be easily seen from the outside. Accordingly, appearance characteristics can be improved while maintaining the detection region of the camera 230.

In addition, in the embodiment, as the camera 230 includes the lens 232 disposed on the boundary section 206 between the garnish 204 and the meter panel 205, narrowing of the detection region of the camera 230 can be effectively avoided, and it is more difficult to visually recognize the camera 230 from the outside. Accordingly, appearance characteristics can be further improved while effectively maintaining the detection region of the camera 230.

In addition, in the embodiment, as the boundary section 206 is formed in the recessed section 207 formed by the garnish 204 and the meter panel 205, the garnish 204 and the meter panel 205 can be formed in a shape along an angle of view (a viewing angle) of the camera 230. Accordingly, appearance characteristics can be further improved while more effectively maintaining the detection region of the camera 230.

In addition, in the embodiment, as the lens 232 overlaps the garnish 204 when seen in a side view, since the camera 230 cannot be easily seen from the sides, appearance characteristics from the sides can be further improved. In addition, as the lens 232 overlaps the garnish 204 when seen in a side view, the camera 230 and the lens 232 can be suppressed from being damaged due to collision from the sides.

Further, the present invention is not limited to the embodiment and, for example, the camera may be a camera configured to capture invisible light such as infrared light or the like in addition to visible light. In addition to the camera, an optical sensor such as a radar or the like using infrared light, millimeter waves, or the like, may be provided. A configuration using a single optical sensor rather than a pair of left and right optical sensors may be provided. A configuration in which the camera and the radar are combined may be provided. The disposition of lenses of the cameras in the embodiment is a disposition of antennae in the case of the radar.

All vehicles in which a driver rides across the vehicle body are included as the saddle riding vehicle, and in addition to a motorcycle (including a motorized bicycle and a scooter type vehicle), a three-wheeled vehicle (including a two-front-wheeled and one-rear-wheeled vehicle in addition to a one-front-wheeled and two-rear-wheeled vehicle) or a four-wheeled vehicle is also included.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An optical sensor disposition structure for a saddle riding vehicle including a head pipe, a steering stem that is connected to the head pipe and that includes a bottom bridge, and a vehicle body, the optical sensor disposition structure comprising:
    an optical sensor; and
    an airflow guide member that is disposed in front of a head pipe and that is configured to cover a front section of a vehicle body, and in which an introduction port configured to guide traveling air rearward is formed,
    wherein the optical sensor overlaps the introduction port when seen in a front view, and
    the optical sensor is disposed above the bottom bridge of the steering stem.

2. The optical sensor disposition structure for a saddle riding vehicle according to claim 1, further comprising:
    a second airflow guide member that forms an airflow guide path configured to guide the traveling air between the airflow guide member and the second airflow guide member,
    wherein the optical sensor includes a lens disposed on a boundary section between the airflow guide member and the second airflow guide member.

3. The optical sensor disposition structure for a saddle riding vehicle according to claim 2, wherein the boundary section is formed in a recessed section formed by the airflow guide member and the second airflow guide member.

4. The optical sensor disposition structure for a saddle riding vehicle according to claim 3, wherein the lens overlaps the airflow guide member when seen in a side view.

5. The optical sensor disposition structure for a saddle riding vehicle according to claim 4, wherein the optical sensor is installed inward than the second airflow guide member in a vehicle width direction.

6. The optical sensor disposition structure for a saddle riding vehicle according to claim 3, wherein the optical sensor is installed inward than the second airflow guide member in a vehicle width direction.

7. The optical sensor disposition structure for a saddle riding vehicle according to claim 2, wherein the lens overlaps the airflow guide member when seen in a side view.

8. The optical sensor disposition structure for a saddle riding vehicle according to claim 7, wherein the optical sensor is installed inward than the second airflow guide member in a vehicle width direction.

9. The optical sensor disposition structure for a saddle riding vehicle according to claim 2, wherein the optical sensor is installed inward than the second airflow guide member in a vehicle width direction.

10. The optical sensor disposition structure for a saddle riding vehicle according to claim 1, wherein the optical sensor is disposed adjacent to a headlight of the saddle riding vehicle.

11. An optical sensor disposition structure for a saddle riding vehicle including a head pipe and a vehicle body, the optical sensor disposition structure comprising:
    an optical sensor;
    an airflow guide member that is disposed in front of a head pipe and that is configured to cover a front section of a vehicle body, and in which an introduction port configured to guide an air flow rearwardly is formed, and
    a second airflow guide member that forms an airflow guide path configured to guide the air flow between the airflow guide member and the second airflow guide member,
    wherein the optical sensor overlaps the introduction port when seen in a front view and includes a lens disposed on a boundary section between the airflow guide member and the second airflow guide member.

12. The optical sensor disposition structure for a saddle riding vehicle according to claim 11, wherein the boundary section is formed in a recessed section formed by the airflow guide member and the second airflow guide member.

13. The optical sensor disposition structure for a saddle riding vehicle according to claim 12, wherein the lens overlaps the airflow guide member when seen in a side view.

14. The optical sensor disposition structure for a saddle riding vehicle according to claim 13, wherein the optical sensor is installed inward than the second airflow guide member in a vehicle width direction.

15. The optical sensor disposition structure for a saddle riding vehicle according to claim 12, wherein the optical sensor is installed inward than the second airflow guide member in a vehicle width direction.

16. The optical sensor disposition structure for a saddle riding vehicle according to claim 11, wherein the lens overlaps the airflow guide member when seen in a side view.

17. The optical sensor disposition structure for a saddle riding vehicle according to claim 16, wherein the optical sensor is installed inward than the second airflow guide member in a vehicle width direction.

18. The optical sensor disposition structure for a saddle riding vehicle according to claim 11, wherein the optical sensor is installed inward than the second airflow guide member in a vehicle width direction.

19. The optical sensor disposition structure for a saddle riding vehicle according to claim 11, wherein the optical sensor is disposed adjacent to a headlight of the saddle riding vehicle.

* * * * *